United States Patent [19]

Skipper

[11] Patent Number: 4,614,455

[45] Date of Patent: Sep. 30, 1986

[54] FLEXIBLE JOINTS OR BEARINGS

[75] Inventor: John B. Skipper, Lutterworth, England

[73] Assignee: Dunlop Limited a British Company, England

[21] Appl. No.: 728,213

[22] Filed: Apr. 29, 1985

[30] Foreign Application Priority Data

May 9, 1984 [GB] United Kingdom ................. 8411756

[51] Int. Cl.⁴ ............................................. F16C 11/00
[52] U.S. Cl. .................................. 403/133; 403/140; 403/131
[58] Field of Search ............... 403/131, 132, 133, 130, 403/140; 29/149.5 B, 149.5 NM

[56] References Cited

U.S. PATENT DOCUMENTS 2,536,346 10/1970 Ulderup .............................. 403/140
4,034,996 7/1977 Manita ............................ 403/140 X

FOREIGN PATENT DOCUMENTS 2350087 4/1975 Fed. Rep. of Germany ...... 403/131
2434501 1/1976 Fed. Rep. of Germany ...... 403/133
2831470 1/1980 Fed. Rep. of Germany ...... 403/133
1150912 5/1969 United Kingdom ................ 403/130

Primary Examiner—Andrew V. Kundrat
Attorney, Agent, or Firm—Stevens, Davis, Miller & Mosher

[57] ABSTRACT

A flexible ball type joint or bearing is constructed by inserting into a generally tubular-shaped rigid outer housing an assembly of an inner rigid member having a curved surface of part-spherical or barrel shape, a layer of elastomeric material surrounding said curved surface, and an annular member the inner surface of which is of a part-spherical or barrel shape to conform generally with said curved surface of the inner rigid member, and said annular member having an outer surface which conforms generally to the shape of the rigid outer housing.

Subsequent to insertion of the assembly in the rigid outer housing, the rigid outer housing is adapted to possess a pair of end abutments between which the assembly is located. The outer housing is then subject to radial compression. The annular member is formed of a material of a modulus of elasticity which is higher than that of the elastomeric material and lower than that of the rigid outer housing.

11 Claims, 3 Drawing Figures

FLEXIBLE JOINTS OR BEARINGS

This invention relates to flexible joints or bearings of the kind commonly known as ball joints and which comprise an inner rigid member of ball-like shape and a rigid outer member which extends around the inner rigid member and is maintained spaced therefrom by one or more components of resilient elastomeric material.

Commonly, but not necessarily, the elastomeric material has been bonded to metallic material of the inner and outer rigid members and/or on assembly has been subject to compression between said rigid members so that the required relative orientation and location of the rigid members and the resilient material is maintained during use of the joint or bearing.

Although the conventional design of a ball joint or bearing gives satisfactory operation in service, it is expensive to manufacture and assemble.

In accordance with one aspect of the present invention a method for the fabrication of a flexible ball-type joint or bearing comprises:

forming an assembly of an inner rigid member having a curved surface of part-spherical or barrel shape, a layer of elastomeric material which extends over said curved surface, and an annular member which defines a curved surface of part-spherical or barrel shape for contact with said elastomeric material which is positioned between said inner rigid and annular members, said annular member being of a deformable material having a higher modulus of elasticity than the elastomeric material;

arranging said assembly to be surrounded by a substantially tubular outer rigid member of a material of higher modulus of elasticity than the annular member;

adapting said outer rigid member whereby it is provided with a pair of end abutments for axial location of the annular member and layer of elastomeric material, and subjecting the outer rigid member to radial compression whereby the annular member is subject to deformation and the layer of elastomeric material is loaded in compression.

The aforementioned assembly of the inner rigid member, layer of elastomeric material and the annular member preferably is subject to a vulcanisation treatment to bond the elastomeric material to both the inner rigid and annular members. Preferably said fully bonded assembly is formed prior to insertion of any of the components of the assembly into the outer rigid member.

In an alternative method the assembly may comprise a layer of elastomeric material which is prevulcanised, and which optionally is united with at least one of the inner rigid and annular members by a subsequent and post vulcanisation bonding operation.

It is envisaged that normally the layer of elastomeric material will be bonded or otherwise united, such as by the use of adhesives, to the inner rigid and annular members but this is not essential. When the layer of elastomeric material is to be subject to a high degree of radial compression by the outer rigid member the resulting frictional resistance to relative movement between the elastomeric material and inner rigid and annular members may be sufficient to avoid undesirable slipping movement at the interfaces with the elastomeric material under the working deflections to be experienced by the joint or bearing in use. For some applications the outer rigid member may have a slightly rough inward facing surface for contact with the annular member to restrain relative movement therebetween.

It is further envisaged that normally the outer member will be restrained against movement relative to the annular member such as by virtue of the frictional resistance due to the radial compression forces or, for example, by the use of adhesives. However, said restraint is not essential and for some applications relative slipping movement may be permitted—for example by ensuring that the radial compression loads are not too great and that materials of low coefficient of friction are employed.

Preferably deformation of the outer rigid member arising by virtue of its having been subject to compression forces to impart residual compression to the layer of elastomeric material is controlled so that the outer dimensions of the outer rigid member after compression correspond closely to any such dimensions required of the resultant joint or bearing for installation in or location relative to one of two components to be connected. Alternatively, however, the rigid outer member may be subject to a machining operation subsequent to compression and deformation so that the outer dimensions thereof correspond with those required for the intended use of the resultant joint bearing.

The inner rigid member preferably comprises a cylindrical shape tube or rod to an outer surface of which is secured one or more elements which define a part-spherical or barrel shaped surface of the inner rigid member. The part-spherical or barrel shaped surface may be defined by a solid ring of material having a cylindrical bore of a diameter corresponding to the outer diameter of the tube or rod to which it is secured, and an outer surface which is of the required part-spherical or barrel shape. The ring may be secured to the rod or tube by welding, brazing, adhesives or other means selected having regard to the materials involved and which may include metallic materials, plastics, and composites such as fibre reinforced plastics.

The part-spherical or barrel shaped surface of the inner rigid member alternatively may be defined by a shell-like structure, such as of pressed metal, provided around the rod or tube. The shell-like structure may be of an annular or segmental form, or may be formed from a strip of transversely curved material which is wrapped around the rod or tube, the ends of the strip being secured together to maintain the strip in the required ring-like shape.

In a further alternative construction the inner rigid member may comprise a hollow or solid spherical, part-spherical or barrel shaped member secured to or integral with one end of a support rod or tube.

Preferably said annular member is formed of a substantially non-resilient moulded material. Plastics materials, such as nylon, are preferred for the annular member but other materials, for example metallic materials such as zinc alloy, may be employed.

In accordance with another aspect of the present invention there is provided a flexible ball type joint or bearing comprising:

a layer of elastomeric material which extends around an inner rigid member of part-spherical or barrel shape; an outer rigid member which extends around the layer of elastomeric material and inner rigid member and maintains the layer of elastomeric material in residual compression between said rigid members;

the outer rigid member comprising a pair of end abutments for axial location of the layer of elastomeric material, and between said end abutments a tubular body portion within which is provided at least one annular member which defines a part-spherical or barrel shaped surface for contact with the layer of elastomeric material and is formed from a material having a modulus of elasticity which is higher than that of the layer of elastomeric material and less than that of the outer rigid member.

The end abutments preferably are formed by deformation of that material, preferably steel, which forms the central body portion of the outer rigid member.

The annular member preferably comprises a pair of rings, for example moulded plastics rings, which may lie slightly spaced or abut axially in the assembled joint or bearing. Preferably the annular member is bonded to the layer of elastomeric material.

In constructions having an annular member bonded to the layer of elastomeric material it may for some applications be desirable to provide the annular member with a substantially smooth surface for contact with the tubular body portion of the outer rigid member so that there is permitted a controlled slippage between the annular member and tubular body portion in use of the joint or bearing under certain load conditions.

Suitable materials for the outer rigid member include metallic materials such as brass or steel the material selected being one which has a higher modulus of elasticity than that of the annular member material whereby the annular member may be deformed without undue difficulty when the outer rigid member is subject to radial compression to radially precompress the elastomeric material. The material of the outer rigid member should be one for which the yield point is exceeded when the necessary radial compression is applied for the purpose of preloading the layer of elastomeric material.

Preferably the annular member is of a two-part construction, for example two inserts each in the form of an annular ring and said rings being arranged to lie in close proximity or abut one another axially thereby to define said radially inner surface of part-spherical or barrel shape.

Where the annular member is of a two-part construction it is preferred that the abutting or facing ends of the two annular rings be of substantially negligible thickness. In consequence the overall radial dimensions of the flexible joint or bearing may be kept to a minimum.

One embodiment of the invention will now be described, by way of example, with reference to the accompanying diagrammatic drawings wherein.

Figure 2:
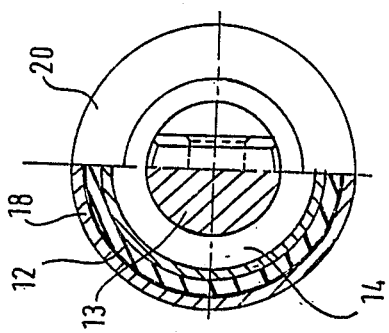
FIG. 2 is an end view of the bearing of FIG. 1, half in section on the line II—II of FIG. 1.
Figure 1:
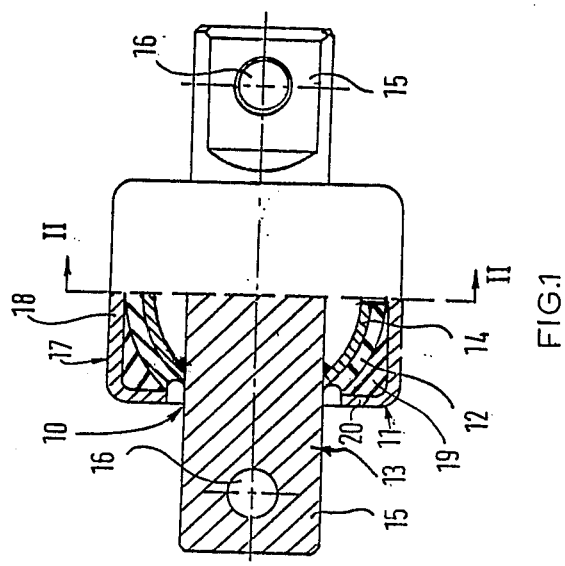
FIG. 1 is a side view, the left half in longitudinal section, of a flexible bearing in accordance with the present invention.
Figure 3:
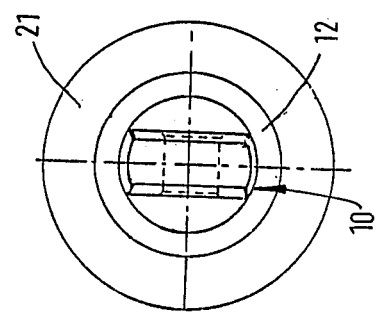
FIG. 3 is an end view of the bearing of FIGS. 1 and 3 wherein compressed radially.

A flexible bearing for location as a force fit into a housing (not shown) comprises an inner rigid assembly 10, an outer rigid assembly 11 and located between said inner and outer rigid assemblies a layer 12 of resilient elastomeric material such as natural rubber.

The inner rigid assembly 10 is of a two-part construction of a solid rod 13 for extending through the flexible bearing and an outer metal shell 14 secured to the outer surface of the rod.

The rod 13 is of circular cross-sectional shape and is formed at each end with a tongue-like portion 15 through which extends a hole 16, said holes of the two end portions facilitating attachment of the bearing assembly to one of two components to be interconnected by the bearing.

The layer 12 of natural rubber is secured by adhesive to the outer part-spherical surface of the shell 14. Said layer 12 is of substantially uniform thickness and therefore presents an outer surface also of part-spherical shape and to which the outer rigid assembly 11 is secured by adhesive.

The outer rigid assembly 11 is of a three-part construction comprising an outer member 17 having a cylindrical-shaped centeral portion 18 within which is provided a pair of rings 19 of plastics material moulded so as each to have an inner surface of part-spherical shape for adhesion to the rubber layer 12, and an outer surface of part-cylindrical shape for frictional engagement with the radially inner surface of the cylindrical portion 18 of the outer member.

The outer member 17 is formed of pressed metal and prior to assembly with the other components of the flexible bearing is in the form of a cylindrical portion comprising said aforementioned central cylindrical portion 18, and additional cylindrical portions (not shown) extending from each end of the central cylindrical portion. Prior to assembly one of said end portions may be deformed to define a radially inwardly directed flange 20 which provides an axial abutment face for one of the plastics rings 19.

In manufacture of the flexible bearing the inner rigid assembly 10 and the plastics rings 19 are positioned in a mould with the rings in axial abutment and a uniform spacing between said rings and the shell 14 of the outer rigid assembly 10. Elastomeric material is then injected into said space and subsequently vulcanised in such a manner as to result in a bonded assembly of the inner rigid assembly, layer of elastomeric material and the two annular rings 19.

The assembly so formed is then inserted into the outer member 17 the ends of which are deformed so as to form a pair of end abutment flanges 20 which bear against respective axially outer end faces of the two annular plastics rings 19.

The resulting assembly is then subject to radial compression to reduce the diameter of the outer rigid assembly 17 to a diamter which is preselected to fit into the housing in which the bearing is to be force fitted for eventual use, the said reduction of diameter of the outer housing being such as to provide the required degree of precompression of the elastomeric material of layer 12.

In an alternative method for manufacture of the flexible bearing the layer 12 of resilient elastomeric material is bonded to the part-spherical shape outer surface of the shell 14. One moulded plastics ring 19 is then inserted into the outer rigid member into abutment with the end flange 20. The part-spherical shaped outer surface of the layer 12 of elastomeric material is then coated with an adhesive and the bonded assembly of the elastomeric material and inner rigid assembly 10 is then positioned within the outer rigid member with one end portion 15 of the rod 13 extending through the opening defined by the inner periphery of the flange 20. The second moulded plastics ring 19 is then inserted within the outer rigid member and the cylindrical end portion of the outer rigid member at the opposite end of the central cylindrical portion 18 to that of the flange 20 is then deformed so as to form a second flange 21 of substantially similar shape to that of flange 20 and in abutment with the second of the two moulded plastics rings.

In a further alternative embodiment of the invention the layer 12 of elastomeric material may be bonded to the inner rigid assembly 10 subsequent to insertion within the outer rigid assembly 11.

I claim:

1. A method for the manufacture of a flexible ball-type joint or bearing comprising:

forming an assembly of an inner rigid member having a curved surface of part-spherical or barrel shape, a layer of elastomeric material which extends over said curved surface, and an annular member which defines a curved surface of part-spherical or barrel shape for contact with said elastomeric material which is positioned between said inner rigid and annular members, said annular member being of a deformable material having a higher modulus of elasticity than the elastomeric material; arranging said assembly to be surrounded by a substantially tubular outer rigid member of a material of higher modulus of elasticity than the annular member;

adapting said outer rigid member whereby it is provided with a pair of end abutments for axial location of the annular member and layer of elastomeric material, and subjecting the outer rigid member to radial compression whereby the annular member is subject to deformation and the layer of elastomeric material is loaded in compression.

2. A method according to claim 1 wherein the annular member comprises two annular rings.

3. A method according to claim 2 wherein one annular ring is fitted into the tubular outer member to abut an inwardly directed abutment means at one end of said body portion and the other annular ring is fitted into the tubular outer member subsequent to insertion of the inner rigid member and layer of elastomeric material.

4. A method according to claim 1 wherein said annular member is bonded to the layer of elastomeric material.

5. A method according to claim 1 wherein the annular member is formed of a substantially non-resilient moulded material.

6. A flexible ball-type joint or bearing comprising:

a layer of elastomeric material which extends around an inner rigid member of part-spherical shape;

an outer rigid member which extends around the layer of elastomeric material and inner rigid member and maintains the layer of elastomeric material in residual compression between said rigid members;

the outer rigid member comprising a pair of end abutments for axial location of the layer of elastomeric material, and between said end abutments a tubular body portion within which is provided an annular member which defines a part-spherical shape surface for contact with the layer of elastomeric material and is formed from a material having a modulus of elasticity which is higher than that of the layer of elastomeric material and less than that of the outer rigid member.

7. A flexible joint or bearing according to claim 6 wherein said annular member comprises two axially aligned rings.

8. A flexible joint or bearing according to claim 7 wherein said two annular rings are spaced axially in the assembled joint or bearing.

9. A flexible joint or bearing according to claim 7 wherein confronting ends of said annular rings are of substantially negligible thickness.

10. A flexible joint or bearing according to claim 6 wherein said annular member is bonded to the layer of elastomeric material.

11. A flexible joint or bearing according to claim 6 wherein said end abutments are integral with that material which forms the central body portion of the outer rigid member.

* * * * *